United States Patent [19]

Rosen

[11] Patent Number: 5,727,946
[45] Date of Patent: Mar. 17, 1998

[54] MULTICOLORED TUTORIAL STAMPERS

[75] Inventor: Lawrence I. Rosen, Mendham, N.J.

[73] Assignee: Rose Art Industries, Livingston, N.J.

[21] Appl. No.: 706,672

[22] Filed: Sep. 6, 1996

[51] Int. Cl.[6] ............................ G09B 19/00; B41K 1/02
[52] U.S. Cl. ........................ 434/159; 101/327; 434/170
[58] Field of Search ........................... 434/159, 170; 101/405, 327, 333

[56] References Cited

U.S. PATENT DOCUMENTS

| | | | |
|---|---|---|---|
| 316,268 | 4/1885 | Homer | 101/333 |
| 1,732,980 | 10/1929 | Mooney | 434/170 |
| 1,841,369 | 1/1932 | Freeman | 434/159 |
| 2,316,040 | 4/1943 | Wirfel | 101/327 |
| 2,584,908 | 2/1952 | Oblinger | 101/333 |
| 2,638,049 | 5/1953 | MacPhes et al. | 101/327 |
| 2,664,820 | 1/1954 | Brown, Jr. | 101/405 |
| 3,464,352 | 9/1969 | Schilling | 101/327 |
| 3,885,495 | 5/1975 | Funahashi | 101/327 |
| 3,948,173 | 4/1976 | Barasch | 1013/333 |
| 3,988,987 | 11/1976 | Ikura et al. | 101/327 |
| 4,188,734 | 2/1980 | Rich | 434/159 |
| 4,325,179 | 4/1982 | Werwa | 101/327 |
| 4,875,411 | 10/1989 | Turner | 101/333 |
| 4,878,844 | 11/1989 | Gasper et al. | 434/159 |
| 4,924,773 | 5/1990 | Gwillam | 101/405 |
| 4,996,921 | 3/1991 | Hong | 101/327 |
| 5,167,503 | 12/1992 | Jordan | 434/159 |

*Primary Examiner*—Paul J. Hirsch

[57] ABSTRACT

Tutorial stampers in logically related sets, such as 26 alphabet stampers, are fabricated with a different color associated with each member of the set. Both the marking fluid and at least a portion of the outer shell each marker match the color associated with the character imprinted by that marker. Preferably the marker cap matches the selected color and the character is imprinted on the marker barrel in the same color. For adults color is a re-enforcing visual cue to help quickly locate the desired character. For children the color difference helps fix in the child's mind the distinction of, for example, each letter of an alphabet or numeral of a number set. In the business world, different colors can be used, in association with a set of distinctive symbols to identify different functional portions of large organization and set of stampers organized in that way can be used, for example, in the organization's mail room to identify package destinations.

1 Claim, 2 Drawing Sheets

MULTICOLORED TUTORIAL STAMPERS

BACKGROUND OF THE INVENTION

1. Field of the Invention

The invention is in the field of marking instruments, particularly education-related markers.

2. Brief Description of the Background Art

Stamps and stamp pads have long been a fixture of civilization from the signature chops of Chinese emperors to the smile faces printed by elementary school teachers on their students' best work. Such stamps, most commonly of rubber, are in broad use to imprint pictures, symbols and various business or personal messages. They are most commonly used in combination with inked pads. However, stamp markers are currently available in various colors for decorative use to stamp colored shapes onto substrates of various sorts. Some such stamp markers are available in the form of marker pens with porous nibs and a supply of marking fluid in the barrel.

It is recognized in the teaching field, that use can be made of one sense to re-enforce the teaching of other sensory phenomena. For example, U.S. Pat. No. 4,762,493 discloses the use of the sense of smell to teach color recognition. That patent discloses, for example, a set of crayons of different colors wherein each crayon is manufactured with a scent that is rationally related to its color. The user of the crayon will learn to associate the color with the scent. An orange crayon, for example, could be impregnated with a citrus scent and a black crayon could be impregnated with a licorice scent.

SUMMARY OF THE INVENTION

The herein disclosed invention relates to use of color as a cue to the recognition of the members of a set of symbols or other shapes that are logically related to on another. Tutorial stampers in logically related sets, such as 26 alphabet stampers, are fabricated with a different color associated with each member of the set. Both the marking fluid and at least a portion of the outer shell each marker match the color associated with the character imprinted by that marker. Preferably the marker cap matches the selected color and the character is imprinted on the marker barrel in the same color. For adults color is a re-enforcing visual cue to help quickly locate the desired character. For children the color difference helps fix in the child's mind the distinctiveness of, for example, each letter of an alphabet or numeral of a number set. In the business world, different colors can be used, in association with a set of distinctive symbols to identify different functional portions of large organization and set of stampers organized in that way can be used, for example, in the organization's mail room to identify package destinations.

DETAILED DESCRIPTION OF THE INVENTION

Figure 1:
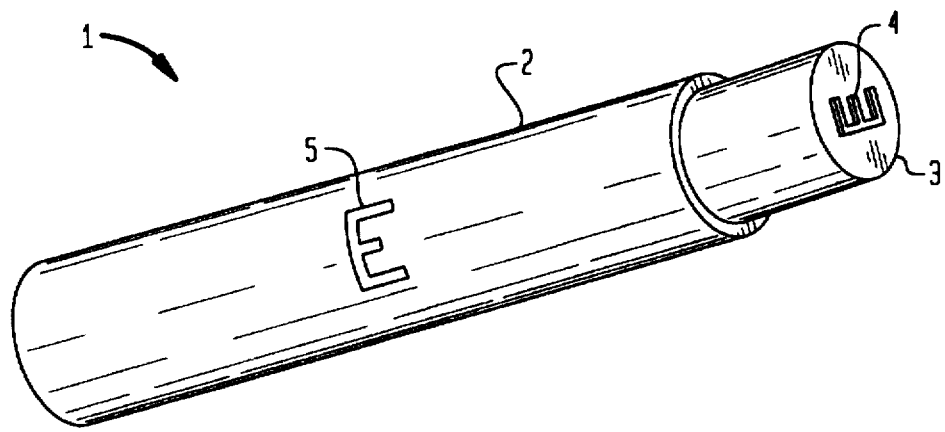
FIG. 1 is a perspective view of an exemplary stamper of the invention showing a nib with a raised character portion.

FIG. 1 shows a stamper 1 with a barrel 2 terminated by a porous nib 3. The nib has a raised portion 4 defining the letter "E." The same letter, "E," is imprinted on the barrel 2. The letter "E," is one member of a set of logically related characters, the letters of the English alphabet. The barrel 2 encloses a supply of marking fluid of a selected color. The marker 1 is one of a set of markers, each with a nib 3 defining a different character of the set (e.g., a different letter of the alphabet). The marking fluid within each marker of the set is of a different color.

Use of a different color marking fluid in each marker of the set has several advantages. It is well known in the educational sciences, that the use of different senses, in combination, is a more powerful educational force than use of one sense by itself. In this invention the sensing of shape is re-enforced by the sensing of color. For children learning the alphabet, the first element of letter recognition is recognizing that the letters each differ in shape. Here this is re-enforced by the difference in color.

Figure 2:
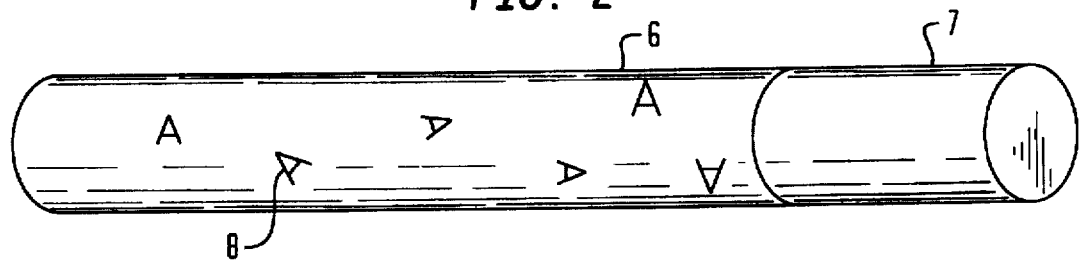
FIG. 2 is a perspective view of an exemplary marker of the invention showing the nib protected by a cap.

Another feature that can help to re-enforce the association of color with the character imprinted by each marker 1 is imprinting the same character 5 on the barrel 2, preferably in the same color as is imprinted by the nib 3. FIG. 2 also illustrates a marker's barrel 6 imprinted with the character 8, preferably in the associated color. It further shows a cap 7 enclosing the nib, preferably either partly or all of the same color, or close to the same color, as the marking fluid and the letter 8 imprinted on the barrel 6.

Figure 3:
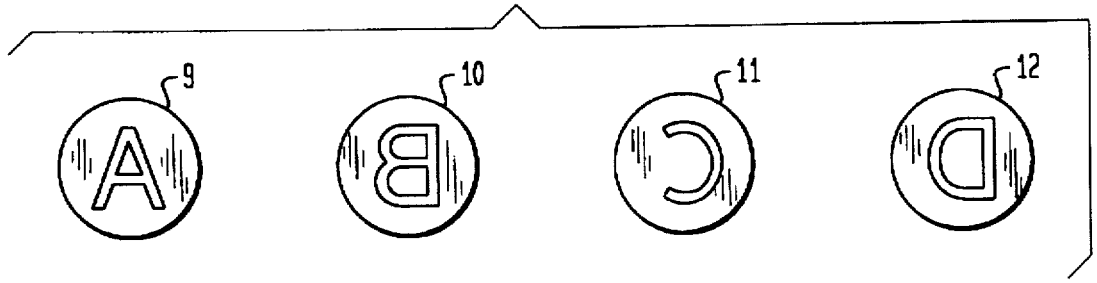
FIG. 3 is a plan view of four members of an exemplary set of alphabet nibs.

FIG. 3 shows marker nibs with raised portions defining four members 9, 10, 11, 12 of an exemplary set of logically related characters, the first four letters of the English alphabet. In accordance with the present invention each marker contains a different color marking fluid. A complete set of such stampers consists of twenty-six stampers, imprinting the twenty-six letters in twenty-six different colors. The Table defines an exemplary set of twenty-six colors represented as coefficients in the Pantone Universal Color System. Techniques are well known in the marking fluid and plastics arts to match ink and plastic colors closely enough to colors defined in the Pantone system so that the different colors associated with the different characters can be differentiated by human eyes with normal color vision.

TABLE

| | | |
|---|---|---|
| A | Pantone | Black 7 |
| B | " | Red 032 |
| C | " | 3005 |
| D | " | 355 |
| E | " | 109 |
| F | " | 499 |
| G | " | 165 |
| H | " | 2592 |
| I | " | 376 |
| J | " | 322 |
| K | " | 2756 |
| L | " | 239 |
| M | " | Warm Red |
| N | " | 145 |
| O | " | 506 |
| P | " | 238 |
| Q | " | 172 |
| R | " | 211 |
| S | " | 2985 |
| T | " | 3295 |
| U | " | 1375 |
| V | " | 2573 |

TABLE-continued

| | | |
|---|---|---|
| W | " | 230 |
| X | " | 285 |
| Y | " | Violet |
| Z | " | 143 |

A character of the set of logically related characters associated with a particular color can consist of a subset of characters. For example, one color can be used in markers imprinting both an upper case letter (e.g., "A") and the same letter in the lower case (e.g., "a"). This would help a child learn the fact that the two different shapes are closely associated with one another. The English alphabet, with twenty-six letters (and other multiletter alphabets) represents a particularly important use of the disclosed invention, because of the educational reenforcement achieved through use of the color sense.

Figure 4:
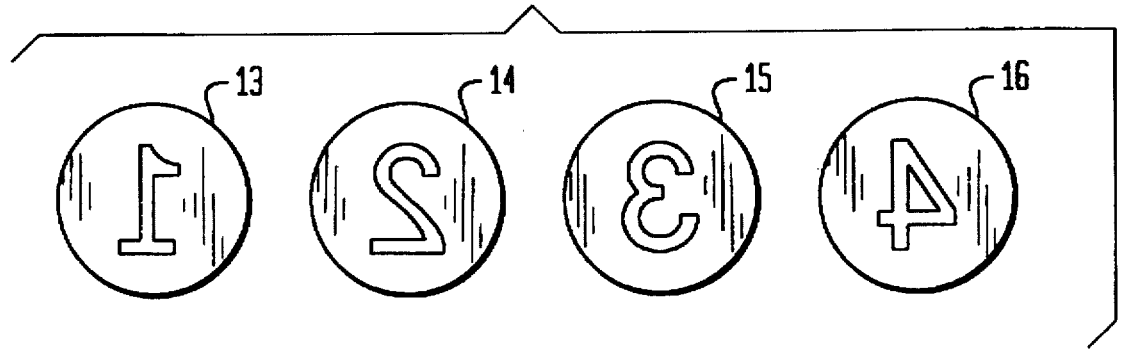
FIG. 4 is a plan view of four members of an exemplary set of numeric nibs.

FIG. 4 illustrates marker nibs 13, 14, 15 16 that are shaped to imprint four Arabic numerals of the logically related set of ten Arabic numerals. In the stamp markers of the invention each numeral would be assigned a different and distinctive color.

Letters and numerals are only two examples of logically related symbol sets. While these are particularly important for educational purposes, other logically related sets of representational symbols can be designed.

Figure 5:
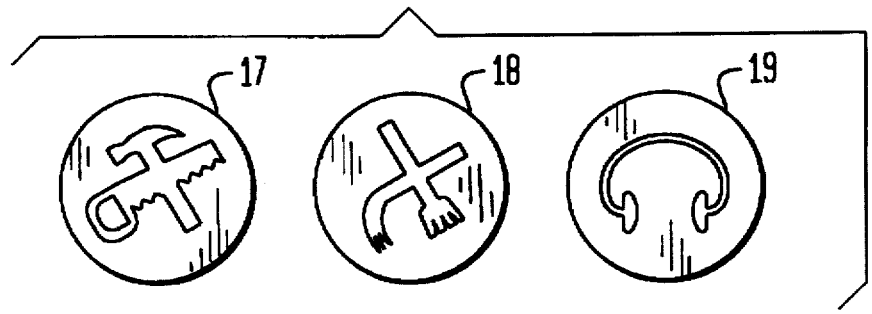
FIG. 5 is a plan view of three members of an exemplary set of symbolic nibs.

In another application of the invention a set of character stamping nibs in which each character represents a functional department of a larger business organization is illustrated in FIG. 5. Here, marker nibs 17, 18, 19 imprinting characters representing the repair 17, janitorial 18, and audio 19 departments of a building management organization, form a portion of a logically related set. Such stampers could be used in the organization's mail room to mark the destination of packages. The color differentiation would help the mail sorter reach for the correct stamp and would help the deliverer bring the package to the correct destination.

What is claimed is:

1. A plurality of stampers, each stamper comprising a barrel, a supply of marking fluid enclosed within the barrel, a character nib terminating the barrel, and a protective cap for encasing the nib wherein:

a. the character nib of a first stamper is adapted for imprinting a first character of a logically related character set;

b. the marking fluid enclosed within the first stamper is of a first color of a plurality of different colors, the number of different colors being coincident with the number of characters in the character set, each color of the plurality of different colors being associated with one character of the character set;

c. at least a portion of the outer surface of the stamper, including the cap, is of the first color; and d. the barrel bears an imprint of the first character in the first color whereby the stamper is adapted for imprinting the first character in the first color on a substrate.

* * * * *